United States Patent [19]
Murray et al.

[11] Patent Number: 5,831,545
[45] Date of Patent: Nov. 3, 1998

[54] METHOD AND APPARATUS FOR ADJUSTING A COMMUNICATION STRATEGY IN A RADIO COMMUNICATION SYSTEM USING LOCATION

[75] Inventors: Bradley Arlice Murray; Gregory Paul Cheraso, both of West Palm Beach, Fla.

[73] Assignee: Motorola, Inc., Schaumburg, Ill.

[21] Appl. No.: 519,677

[22] Filed: Aug. 25, 1995

[51] Int. Cl.⁶ ........................................... H04Q 7/12
[52] U.S. Cl. .................. 340/825.49; 340/825.44; 340/311.1; 455/185.1; 455/426; 455/31.3; 455/67.3; 455/69; 370/313; 371/5.5; 342/357
[58] Field of Search .................. 340/825.49, 825.44, 340/825.47, 825.52, 825.69, 311.1; 455/185.1, 426, 31.1, 31.2, 31.3, 32.1, 67.3, 69; 370/310, 312, 313; 371/5.5; 342/357

[56] References Cited

U.S. PATENT DOCUMENTS

| | | | |
|---|---|---|---|
| 4,580,262 | 4/1986 | Naylor et al. | 371/5.5 |
| 4,825,193 | 4/1989 | Siwiak et al. | 340/311.1 |
| 4,939,731 | 7/1990 | Reed et al. | 371/32 |
| 4,991,184 | 2/1991 | Hashimoto | 375/219 |
| 5,043,736 | 8/1991 | Darnell et al. | 342/357 |
| 5,128,942 | 7/1992 | Kojima | 371/5.5 |
| 5,128,965 | 7/1992 | Hendriksson | 375/285 |
| 5,235,633 | 8/1993 | Dennison et al. | 379/60 |
| 5,392,451 | 2/1995 | Schwendeman | 455/13.1 |
| 5,396,540 | 3/1995 | Gooch | 342/357 X |
| 5,396,643 | 3/1995 | Frenzer et al. | 455/13.1 |
| 5,517,690 | 5/1996 | Linquist et al. | 455/33.1 |
| 5,546,411 | 8/1996 | Leitch et al. | 371/5.5 |
| 5,546,445 | 8/1996 | Dennison et al. | 379/60 |
| 5,563,606 | 10/1996 | Wang | 342/357 X |

*Primary Examiner*—Brian Zimmerman
*Assistant Examiner*—William H. Wilson, Jr.
*Attorney, Agent, or Firm*—James A. Lamb

[57] ABSTRACT

An acknowledge back portable selective call radio (10) for use in a selective call signal radio system (100) and method for determining selective call radio location (200–300), wherein the selective call radio (10) comprises a transceiver (14) for receiving selective call signals and transmitting acknowledge back signals, a processor (24) for monitoring and processing received selective call signals to monitor errors in the selective call signal, a global positioning system receiver (12) activated by the processor (24) when the number of errors exceeds a predetermined threshold, wherein the global positioning system receiver (12) receives satellite transmitted signals for triangulating the position of the selective call radio (10), and wherein the geographic location determined by the processor (24) is transmitted in the acknowledge back signal to the selective call signal transceiver station (110) where a transmission strategy is selected in accordance with the location of the selective call radio (10).

36 Claims, 5 Drawing Sheets

METHOD AND APPARATUS FOR ADJUSTING A COMMUNICATION STRATEGY IN A RADIO COMMUNICATION SYSTEM USING LOCATION

FIELD OF THE INVENTION

This invention generally relates to selective call radios and communication systems, and more particularly, to an improved acknowledge back system, portable selective call radio and method for adjustably selecting a communication strategy to transmit messages based on the radio's reported geographic location.

BACKGROUND OF THE INVENTION

In selective call radio communication systems, the signal quality of selective call signals/messages received by a selective call radio transceiver is typically affected by the selective call radio's transceiver's distance from the transmitter antenna and interference in the transmitter's coverage area, which causes messages to be received with detectable, uncorrectable, errors. For instance, errors in a received message can occur if the transceiver is located at the fringe, or edge, of the selective call system's transmission coverage area. Detectable errors also occur in areas well within the coverage of the transmitting antenna in locations where there are high levels of interference, such as that caused by buildings, mountainous terrain, FM radio towers, or other sources of radio frequency interference. The rate of errors which occur in these fringe and interference areas can usually be related in a predetermined manner to parameters of messages being transmitted, such as baud rate and coding method, and also to a transmit power level. Although current selective call radios and systems can typically detect errors, they cannot typically determine why a selective call radio's transceiver is receiving errored messages. Thus, although a communication strategy available to the system, such as a best baud rate, transmit frequency, or power level, may exist for a selective call radio at a particular location relative to a transmitter, the system may not select the best baud rate, transmit frequency, signal level, etc. to overcome the error-producing environment experienced by the transceiver in its current location.

Current acknowledge back systems have the ability to adjust communication parameters and retransmit a message to a portable transceiver upon receiving such a request from the transceiver, to increase the odds that a transceiver will receive the correct data or message. However, these current acknowledge back systems cannot determine why a transceiver is receiving errored message and make adjustments on a trial and error basis in response to acknowledge back signals. For instance, Siwiak et al., U.S. Pat. No. 4,825,193, discloses an acknowledge back pager with adaptive variable transmitter output power, comprising a pager which includes a receiver for receiving paging signals, a threshold detector for determining whether the signal level of the received page exceeds a predetermined level and a transmitter for transmitting an acknowledge back signal at a power level that does not interfere with other pagers and acknowledge back signals in the airways.

A cellular position locating system, U.S. Pat. No. 5,043,736, issued to Darnell et al., discloses a cellular portable locating unit useful as a cellular telephone and portable global positioning system for ascertaining the latitude and longitude of an individual at a remote location. The cellular positioning system disclosed by Darnell et al. provides a system for tracking the location of a cellular device.

Other radio systems are disclosed in the background art. For instance, Naylor et al., U.S. Pat. No. 4,580,262, comprises a method of controlling transmission power of a radio signal to a minimum level sufficient for efficient reception by using error correction code. Signals are transmitted at various power levels with the number of errors being monitored at the different levels to determine whether they fall below an acceptable threshold value. Another system is disclosed by Reed et al., U.S. Pat. No. 4,939,731, comprising a data transmission system that retransmits a signal if a repeat request is made. A retransmit repeat request is made if an error rate exceeds a predetermined level. Kojima, U.S. Pat. No. 5,128,942, discloses a method and apparatus for data compressing and transmitting video data while combinations of compressing ratio and encoding ratios of the video data is varied in response to conditions of the transmission pack. Hendrickson, U.S. Pat. No. 5,128,965, discloses a digital radio link system and method of adjusting transmission power in a digital radio link system. Finally, Hashimoto, U.S. Pat. No. 4,991,184, discloses a data communication system having a speed setting variable with transmission quality factors, wherein signals are modulated and transmitted on a control channel of an alternate transmission medium from a corresponding station and received and demodulated by a first station, which derives a speed setting command signal from a second set of quality signals, as well as from the first set of quality signals represented by the demodulated signals, and a transmission speed of the first station is controlled according to a speed setting command signal.

Thus, while prior art systems provide a variety of communication strategy optimization methods, the methods are typically selected without determining a cause of poor signal quality and, therefore, have inherent delays which occur while changes to the communication strategy are made and tried until successful communication is received. What is needed is an improved technique for adjusting a communication strategy based on location.

DESCRIPTION OF THE PREFERRED EMBODIMENT

The present invention represents an improvement in acknowledge back paging systems and addresses concerns related to adjusting transmission strategies based on location specific interference by providing an improved acknowledge back paging system which can determine where a selective call radio/transceiver is located and select a best transmission technique corresponding to that location to overcome the error-producing environment in the radio's location for retransmitting messages that were unacceptable in the first transmission.

Figure 1:
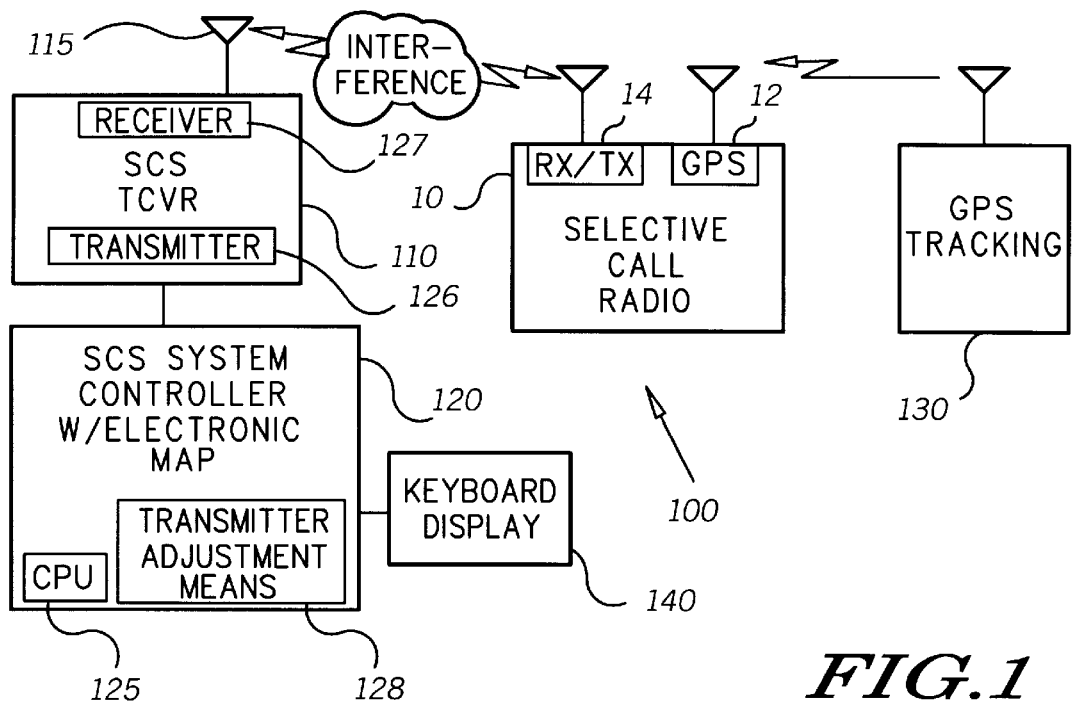
FIG. 1 is an electrical block diagram of a selective call radio communication system in accordance with the preferred and alternative embodiments of the present invention.

With reference to the drawings, FIGS. 1–5 depict the selective call radio 10 and its use in the selective call radio system 100, and the methods 200, 300 of using the global positioning system information in the selective call radio 10 for providing acknowledge back transmissions to facilitate adjusting retransmission communication parameters in response to a determination of the transceiver's location in accordance with the present invention. Referring to FIG. 1, the system 100, in accordance with the instant invention, is shown and comprises a selective call radio 10 having a global positioning system receiver 12 for communicating with a global positioning system 130 that provides location information to the radio 10 via communication with the global positioning system receiver 12. The system 100 also includes a selective call signal transceiver station 110 for transmitting selective call signals to the radio 10 and for receiving acknowledge back selective call signals/messages, including radio transceiver location information, from the radio 10, and a selective call signal system controller 120 including a central processing unit and display coupled by a communication link to the selective call system transceiver station 110. The global positioning system 130 provides the global positioning receiver 12 with a plurality of satellite transmitted position determining signals. Although not shown in detail, the global positioning system 130 comprises a collection of satellites, usually three, which transmit the signals that are received by the positioning receiver 12 and processed and analyzed by a selective call radio processor 24 which is included in the radio 10 to determine position or location information by triangulating the satellite signals. The global positioning system 130 provides an architecture and technique for determining location or position in a manner well understood by one of ordinary skill in the art. Likewise, the selective call radio 10 makes a location determination based on the satellite signals in a manner understood by one of ordinary skill in the art. Thus, the selective call radio 10 and system 100 of the present invention provide architecture and techniques for manipulating the global positioning system signal information to ascertain the geographic location of the radio 10 and select a communication strategy based on the radio location to be used in retransmitting to the radio 10 a previously transmitted message received by the selective call radio 10 with excessive errors (a previously errored message). The communication strategy is selected to improve the probability of correct reception of the message by the selective call radio 10 after retransmission. This represents an improvement to current acknowledge back paging systems.

Again referring to FIG. 1, the selective call system 100 comprises a plurality of conventional selective call transceiver stations 110 coupled by conventional communication links to system controllers 120 for controlling the selective call transceiver stations 110. The selective call system station 110/120 is referred to herein throughout with reference to the transceiver station 110 and the system controller/computer station 120. The hardware of the system controller 120 is preferably similar to the MPS 2000™ paging control center manufactured by Motorola, Inc. of Schaumburg, Ill. The transceiver station 110 comprises a transceiver antenna and a selective call signal base station. Other similar controller hardware can be utilized as well for the controller.

Each of the system stations 110/120 transmits radio signals to a plurality of selective call radios/transceivers 10 via a transmitting and receiving (transceiver) antenna 115. Each of the system stations 110/120 also receives radio signals from the plurality of portable selective call transceivers 10 via the antenna 115. The radio signals transmitted to the radios 10 include the selective call radio/transceiver 10 addresses and the messages intended for the selective call radios 10, while those transmitted to transceiver station 110 are acknowledgements from the selective call transceivers 10, including transmit or retransmit requests and radio location information. Thus, the acknowledgment serves as a confirmation signal and sometimes as a request signal providing radio locations to facilitate improved signal transmission. The instant invention incorporates a global position system receiver 12 in the radio 10 for determining its geographic location. The location is used to determine communication strategy for retransmission of a previously errored message. The global positioning system receiver 12 and a processor 24 included in the selective call transceiver 10 can determine a triangulated location typically within 100 square feet and transmit this location information back to the transceiver station 110. Thus, it will be appreciated that the selective call transceivers 10 can also originate messages other than acknowledgements. The system controller 120 preferably is coupled to a local input device 140, e.g., a conventional keyboard/display terminal, for accepting selective call originations therefrom and is coupled to the public switched telephone network (PSTN) (not shown) for receiving selective call signal originations therefrom. Selective call originations in the PSTN can be generated, for example, from a conventional telephone, a conventional computer/modem, or a conventional facsimile machine coupled to the PSTN in a manner that is well known in the art.

Transmissions between the transceiver stations 110 and the selective call transceivers 10 preferably utilize a well known selective calling signaling protocol, such as one from the family of Motorola FLEX™ protocols. It will be appreciated that other protocols, such as the Golay Sequential Code (GSC) or Post Office Code Standardization Advisory Group (POCSAG) protocol can be utilized as well. These protocols utilize well known error detection and error correction techniques and are therefore tolerant to bit errors occurring during transmission, provided that the bit errors are not too numerous in any one code word. Similar error detection techniques are preferably employed in the selective call radio invention to determine whether retransmission of a selective call signal/message is necessary. FLEX™, for example, utilizes a 32/21 Bose-Chadhuri-Hocquenghem (BCH) code word comprising 21 information bits and 11 parity bits. This code word can be processed in a well known manner, such as bit-by-bit comparison, to correct up to two bit errors occurring within the code word, and to determine whether there are too many bit errors in the code word for the error correction algorithm to correct, thereby leaving uncorrectable errors in the code word and necessitating retransmission. Because of selective call transceiver location and interference, not all bit errors can be corrected without changes in communication strategy. The instant invention facilitates more reliable message transmission or retransmission by using determined radio location coordinates to select a predetermined matching communication strategy.

Forward channel transmissions from the system stations 110/120 preferably utilize four-level frequency shift keyed (FSK) modulation, operating at sixteen-hundred or thirtytwo-hundred symbols-per-second (sps), depending on a decision made in accordance with the preferred embodiment of the present invention, as described hereinbelow. Other transmission modulation techniques may be employed without departing from the scope and spirit of the instant invention. Reverse channel transmissions from the selective call transceivers 10 to the selective call base stations 110/120 preferably utilize binary FSK modulation at a rate of eight-hundred bits per second (bps). Other reverse transmission techniques may be employed without departing from the scope and spirit of the instant invention. Reverse channel transmissions preferably occur during predetermined data packet time slots synchronized with the forward channel transmissions. It will be appreciated that, alternatively, other signaling protocols, modulation schemes, and transmission rates can be utilized as well for either or both transmission directions. The forward and reverse channels preferably operate on a single carrier frequency utilizing well known time division multiplex (TDM) techniques for sharing the frequency. It will be appreciated that, alternatively, the forward and reverse channels can operate on two different carrier frequencies without requiring the use of TDM techniques.

The system station 110/120 comprises a station processor or central processing unit 125 for directing operation of the system controller 120 in the station and at least one transceiver station 110. The station processor 125 is coupled to a conventional four-level FSK transmitter 126 in the transceiver station 110 for transmitting a radio signal comprising either an alert signal or the actual message to the selective call radio/transceiver 10. It is sometimes the case that an originally transmitted message must be retransmitted because of an unacceptable number of detected errors in the message. Alternatively, a first alert signal is transmitted to make a predetermined estimate of expected interference problems so that a transmission strategy may be changed prior to transmitting the message. The station processor 125 is also coupled to at least one conventional binary FSK receiver 127 or similar receiver which is known in the art, for receiving an acknowledgment signal from the radio 10. The acknowledgment signal preferably comprises location and retransmission request. The acknowledgment signal may also include, in accordance with the first alternative embodiment of the present invention described below, a new communication strategy suggestion corresponding to the radio's 10 location and sent from the radio 10 in response to either an errored message or the alert signal. The conventional binary FSK receiver 127 or similar receiver is a portion of the transceiver 110 or, alternatively, is separate from the transceivers 110. The antenna 115 of the transceiver station 110 receives the acknowledgment including the location and message retransmit request from the radio 10 in response to the radio 10 detecting uncorrectable errors in the message that exceed a predetermined limit of uncorrectable errors. In accordance with the preferred and second alternative embodiments of the present invention, the controller 120 comprises a transmitter adjusting means 128, including a preconfigured map, for determining the new transmission strategy from the coordinates received from the radio 10 by comparing the coordinates with optimal communication strategies stored in the map. The transceiver station 110 retransmits the original message under the adjusted communication strategy parameters. The uncorrectable errors are determined by the selective call transceiver 10 and processor 24 in a manner well known in the art and preferably by means of bit error detection, as described herein. Any electrical communication and electrical couplings discussed herein may include additional conventional signal conditioning elements, e.g., filters.

Figure 2:
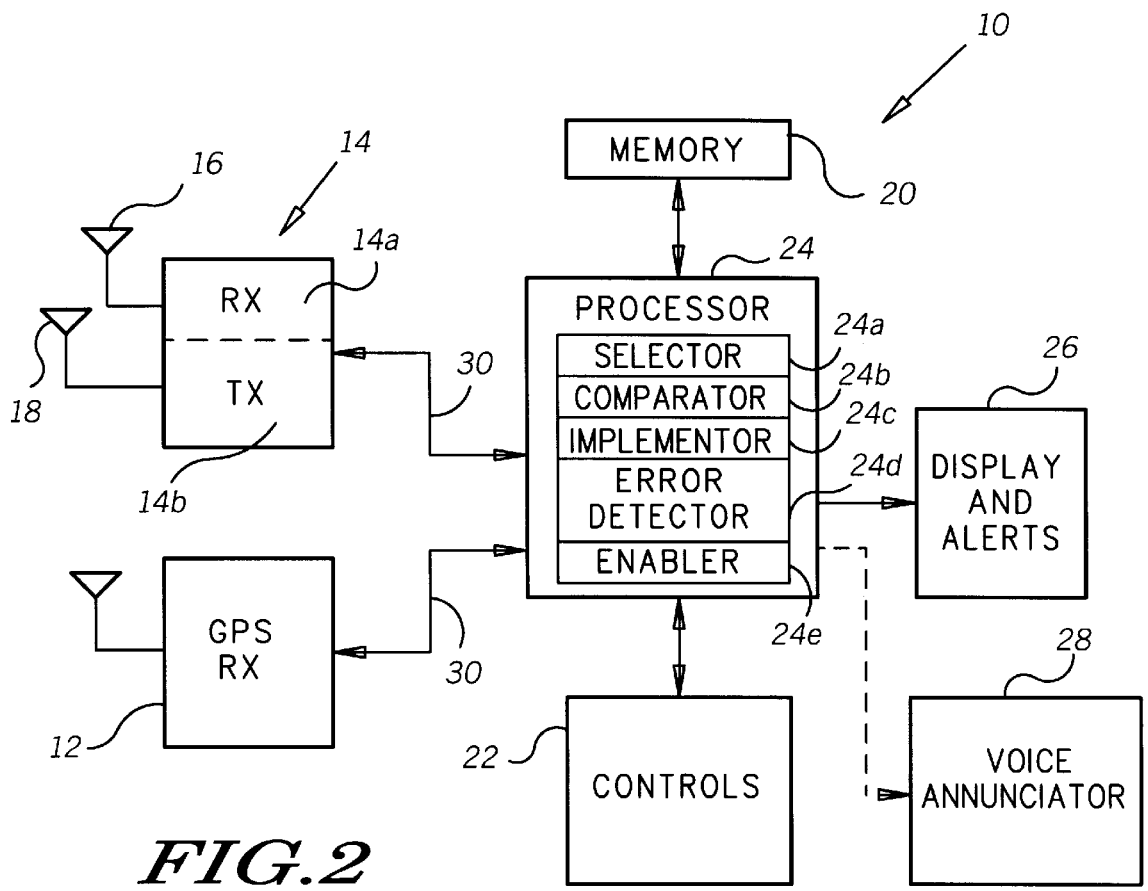
FIG. 2 is an electrical block diagram of the portable selective call radio transceiver, incorporating a global positioning system receiver in accordance with the preferred and alternative embodiments of the present invention.

With reference to FIG. 2, an electrical block diagram of the portable selective call radio/transceiver 10, incorporating a global positioning system receiver 12 is shown. The selective call radio/transceiver 10, in accordance with the preferred embodiment of the instant invention, comprises transceiver circuitry 14, including receiver circuitry 14a and transmitter circuitry 14b, a global positioning system receiver 12, a processor 24, memory 20 (preferably non-volatile), controls 22, display and user alerts 26, and, in the alternative, a voice annunciator 28. The display, user alerts 26, controls 22, and voice annunciator provide user interface techniques to allow a user to manipulate the radio 10. Both the global positioning system receiver 12 and transceiver 14 are coupled to the processor 24 in communication links 30 which may include additional signal conditioning circuitry, such as filters. The processor 24 controls both the global positioning system receiver 12 and the transceiver 14. The transceiver 14 receives messages via an antenna element 16 from the selective call signal transceiver station 110 and also transmits acknowledge back signals back to the selective call signal transceiver station 110 through antenna 18. The global positioning system receiver 12 is used for receiving global positioning system signals from global positioning system satellites 130 which are processed to triangulate the location of the selective call radio 10. The resulting calculated coordinates are stored in memory 20. The global positioning system receiver 12 typically receives a first signal from a satellite, which it stores as a base or nominal signal and uses it for correlating with subsequently transmitted signals received. The global positioning system receiver 12 compares the signals received thereafter from three satellites in the global positioning system 130 to arrive at time differentials between the signals used to make distance calculations that facilitate establishing at least three coordinates surrounding the transceiver 10. These three coordinates triangulate the location of the selective call transceiver 10. The processor 24 is preferably used for deriving the triangulation coordinate calculations. In the alternative, the global positioning system receiver 12 may have its own dedicated processing circuitry for making triangulation calculations from the satellite signal to determine latitude and longitude coordinates as discussed. In either event, the global positioning system receiver 12 is selectively activated by the processor 24 when a number of uncorrectable errors detected in a received message exceed a predetermined limit. Messages are received by the transceiver 14 and monitored by the processor 24 to determine if the received messages contain an unacceptable level of errors. Upon detecting errors in the received message exceeding the acceptable threshold, the processor 24 activates the global positioning system receiver 12. The global positioning system receiver 12 then receives satellite signals as discussed and the location of the transceiver 10 is triangulated in terms of latitude and longitude coordinates and the derived coordinates are stored in memory 20. The processor 24 then activates the transceiver 14 to transmit acknowledge back signals including a retransmit command and location coordinates to the selective call signal transceiver station 110. The acknowledge back, in accordance with the first alternative embodiment, includes the new transmission strategy.

Figure 3:
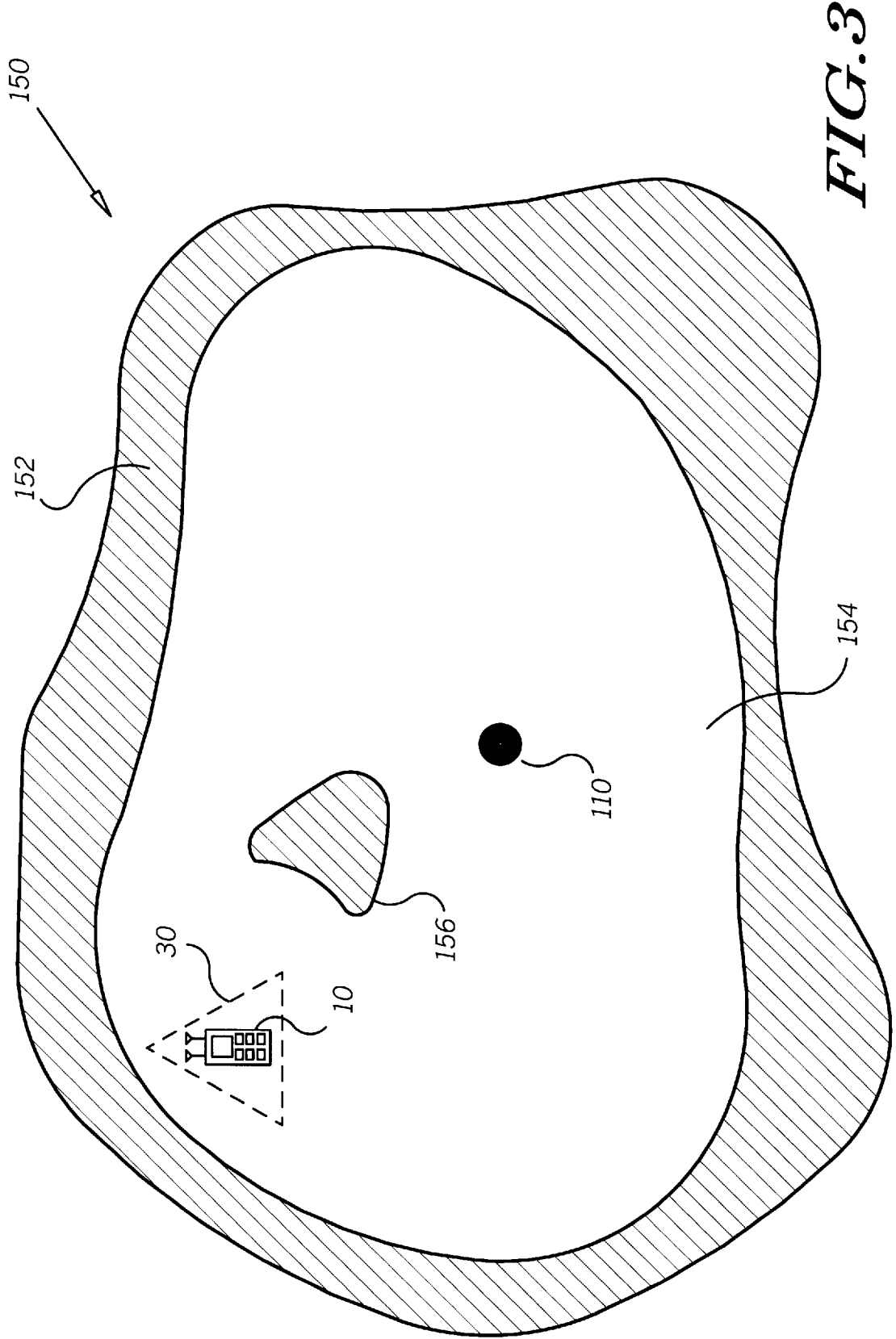
FIG. 3 is a geographic diagram of a typical coverage area map for a single transmitting antenna used at a selective call signal station in a selective call signal system for communicating with a selective call radio transceiver in accordance with the preferred and alternative embodiments of the present invention.

The selective call signal transceiver station 110 comprises its own paging system and transmitting antenna for transmitting messages to selected locations to target transceiver radios 10 having an identifiable address within the transmission antenna's coverage area, as shown in FIG. 3. The transceiver station 110 also includes a receiver antenna and circuitry for receiving the acknowledge back signals. The transceiver antenna of transceiver station 110 may be remotely located from the selective call signal base station or distal therefrom. The relative location of the selective call signal base station and transceiver antenna may vary without departing from the scope and spirit of the instant invention.

As noted above, the selective call radio processor 24 selectively activates and deactivates the global positioning system receiver 12 in response to the received messages containing an unacceptable level of errors. Once the global positioning system receiver 12 and processor 24 derive triangulation calculations for determining latitude and longitude coordinates of the selective call radio/transceiver 10, the retransmit request signal and selective call radio location information are transmitted via the transceiver 14 to the selective call signal transceiver tower or system 110 in accordance with the preferred embodiment of the present invention. In accordance with the first and second alternative embodiment of the present invention, the selective call signal transceiver station 110/120 includes a predetermined and preconfigured electronic map of the coverage area 150 of the transceiver station 110, which includes all known interference producing areas 156. An example of what the electronic map represents is depicted in FIG. 3, which is a typical coverage map for a single transmitting antenna. A fringe area 152 is shown at the periphery of the coverage area 150. The fringe area is the area where the signal level of a signal from the antenna of the transceiver station 100 (FIG. 3) is sufficiently reduced due to distance, such that interference from noise or signals from other transceiver stations 110 is probable. The interference areas 156 (of which there may be a plurality within a coverage area 150) are those areas where distance from the antenna of the transceiver station is irrelevant, that is, not the primary reason for interference. For example, an area where interference is likely because a building "shadows" the signal, or an area where several buildings cause "fading" interference are depicted by interference producing areas 156. The electronic map containing the interference producing area information is used for selecting a communication strategy for retransmitting the previously rejected message. Adjustments to the communication strategy are made in the baud rate, frequency channel, signal power levels, or other communication parameters, depending on the geographic location of the selective call radio 10 and communication strategy parameters stored in the electronic map for known interference areas 156. Based on the interference areas known, adjustments in the communication strategy typically only have to made once, since a preconfigured communication strategy is already known for overcoming the known interference areas. Accordingly, the location information of the selective call radio 10 in the acknowledge back transmit signal serves as feedback for the entire selective call signal system 100.

The processor 24 comprises instruction or code reading hardware, such as a microprocessor, central processing unit, microcontroller, or other similar controller. The processor 24 activates the global positioning system receiver 12 when the transceiver receives a message that contains a number of errors exceeding a predetermined threshold. After the global positioning system receiver 12 receives the satellite signals, the processor 24 processes these signals to make a determination of the location or geographic coordinates of the selective call radio 10. This processed location determination is preferably in coordinates which are absolute global latitude and longitude values. In accordance with the preferred and second alternative embodiments of the present invention, the processor 24 prepares a signal for transmission through the transceiver 14 to the selective call signal system station 110/120 which includes the calculated location of the selective call radio 10 so that adjustments to the communication parameters under which the original message was transmitted can be determined and selected. In accordance with the first alternative embodiment of the present invention, the location coordinates are not necessary for inclusion in the message. These adjustments are typically predetermined adjustments stored in the station 110 relative to the location of the radio 10. Adjustments are made at the station 110 to the baud rate, frequency channel, power/signal level, interleaving levels, or other communication strategy parameters, either individually or in combination. Corresponding and compatible adjustments are made by the radio 10 based on the determined location for receiving the retransmitted message. It should be noted at this point that the message for which an improved communication strategy is necessitated may comprise a preceding alert signal which precedes a transmission of the actual message of interest.

When the selective call radio 10 requires compatible communication strategy parameters in the receiver circuitry 14a to receive the adjusted message transmission, for example, when the baud rate is changed, the processor 24 must take steps to insure proper communication compatibility. In accordance with the preferred embodiment of the present invention, a selectable baud rate protocol, such as one of the FLEX™ family of protocols of Motorola, Inc., is used for sending messages from the transceiver station 110 to the selective call transceiver 10, and when the strategy selected is to decrease the baud rate, the indication of the parameters for the improved communication strategy (i.e., in this case the decreased baud rate) are included at the beginning of the retransmission of the original message. Alternatively, the steps taken to insure proper communication compatibility are not always necessary (such as when the transmit power is increased), but may be done after receiving an alert message indicating the new strategy. It will be appreciated that the alert message indicating the new strategy uses the current (old) strategy but is typically much shorter than the original message and, therefore, has a much higher probability of being received. The processor 24, therefore, includes a medium of processor readable instructions/code which make adjustments to communication parameters, such as those noted above when required. Since the communication strategy is based on the location of the radio 10 and the location is included in the acknowledge back signal, the radio processor 24 implements its own adjustments when necessary to receiver 14a so as to be compatible with transceiver station 110 which also selects a communication strategy based on the radio 10 location.

In accordance with the first and second alternative embodiments, the processor 24 includes a comparitor means for comparing the determined location coordinates of the selective call radio/transceiver 10 and predetermined interference elements with preselected communication strategies known to overcome the interferences in the listed locations where the transceiver 10 could be located. The processor 24 further comprises a selecting means which selects the communication parameters or the transmission strategy identified by the comparitor means for achieving unerrored message transmissions. In accordance with the first alternative embodiment of the present invention, the new strategy is determined by the processor 24 and the new strategy is transmitted to the transceiver station 110. In accordance with the second alternative embodiment of the present invention, the new strategy is determined by the processor 24 and the location coordinates are transmitted to the transceiver station 110 which uses a preconfigired map which includes the same strategy as the radio 10 corresponding to the received location coordinates. In both alternative embodiments of the present invention, the processor 24 uses the new strategy to adjust its receiver 14a and the transceiver station 110 sends the retransmitted message using the new strategy. The CPU in the system station 110/120 includes a similar comparator means and selector means. The communication parameters selected and further noted above may include adjustments in baud rates, frequency, power/signal levels, interleaving levels, or other adjustments known to achieve proper message transmission in light of the interferences. The comparator means and selecting means of the processor 24 preferably comprise, at least in part, a medium of processor readable instructions/code for manipulating corresponding hardware to achieve said adjustments. In addition, the processor 24 may include additional signal conditioning circuitry well understood by a practiced artisan.

In accordance with the preferred and alternative embodiments described above, an alert signal is transmitted, which allows the selective call radio 10 to determine if an acceptable transmission of a selective call signal is possible, and, if not, to determine its location, as noted above, prior to receiving or having the message transmitted. Finally, when a transmit request is transmitted to the selective call signal system station 110/120 or transceiver station 110, the transmit request includes authorization to proceed with a retransmission in accordance with the transmitted location and/or new transmission strategy.

Figure 4:
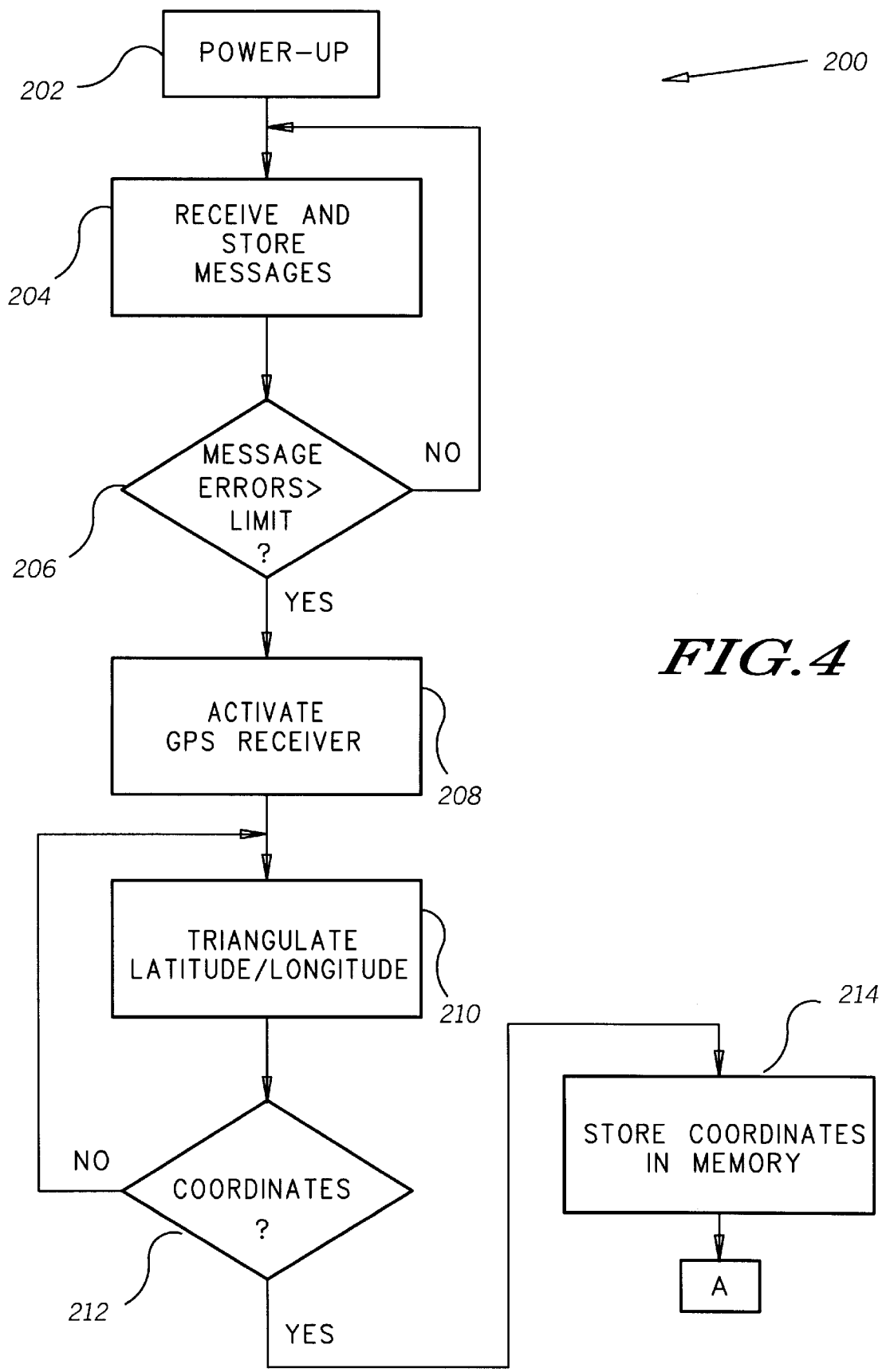
FIG. 4 is a flow chart diagram depicting operation of the selective call radio, including the transceiver and global positioning system receiver, in accordance with the preferred and alternative embodiments of the present invention.
Figure 5:
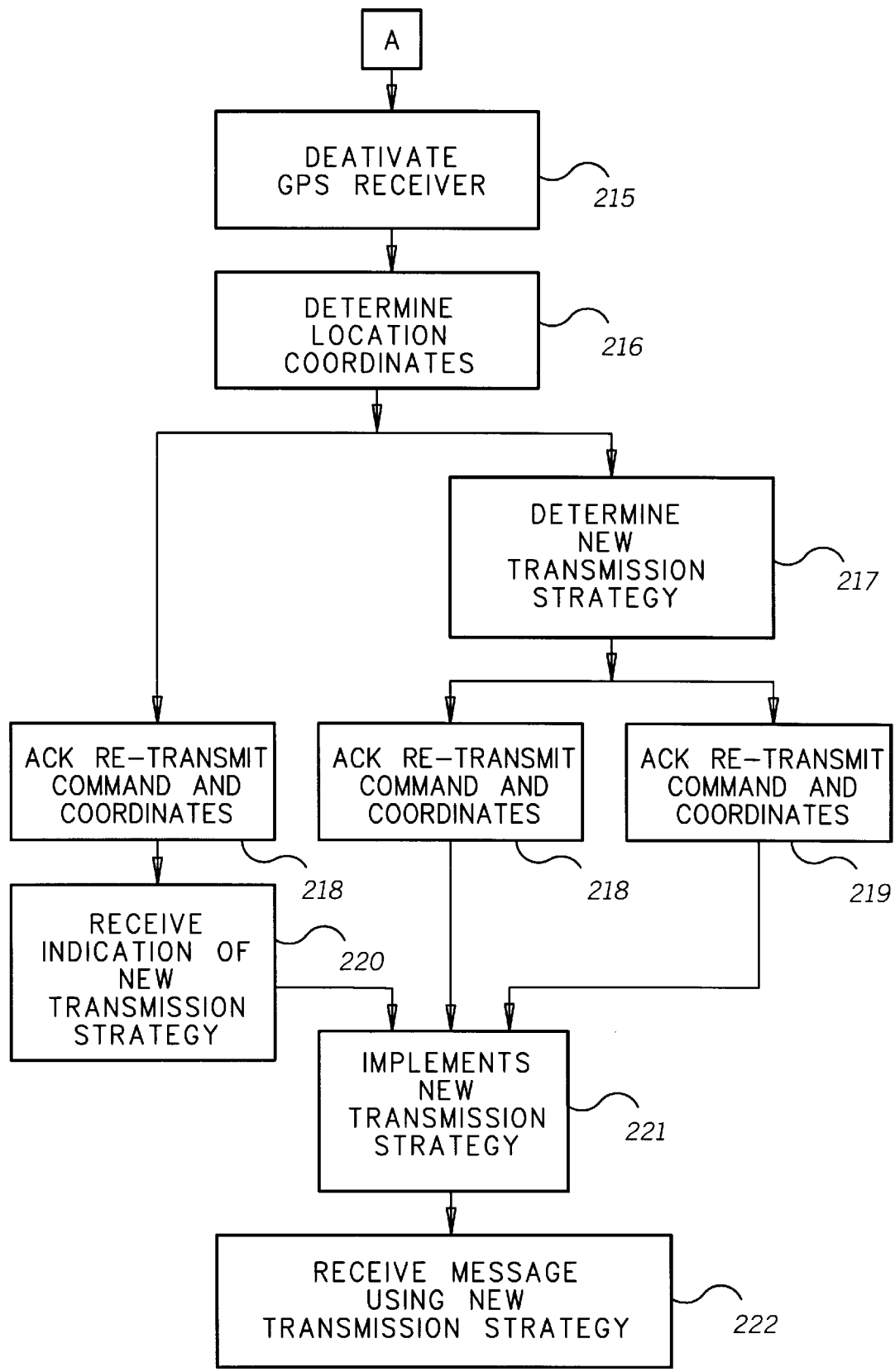
FIG. 5 is a flow chart diagram depicting operation of the selective call radio system in accordance with the preferred and alternative embodiments of the present invention.
Figure 6:
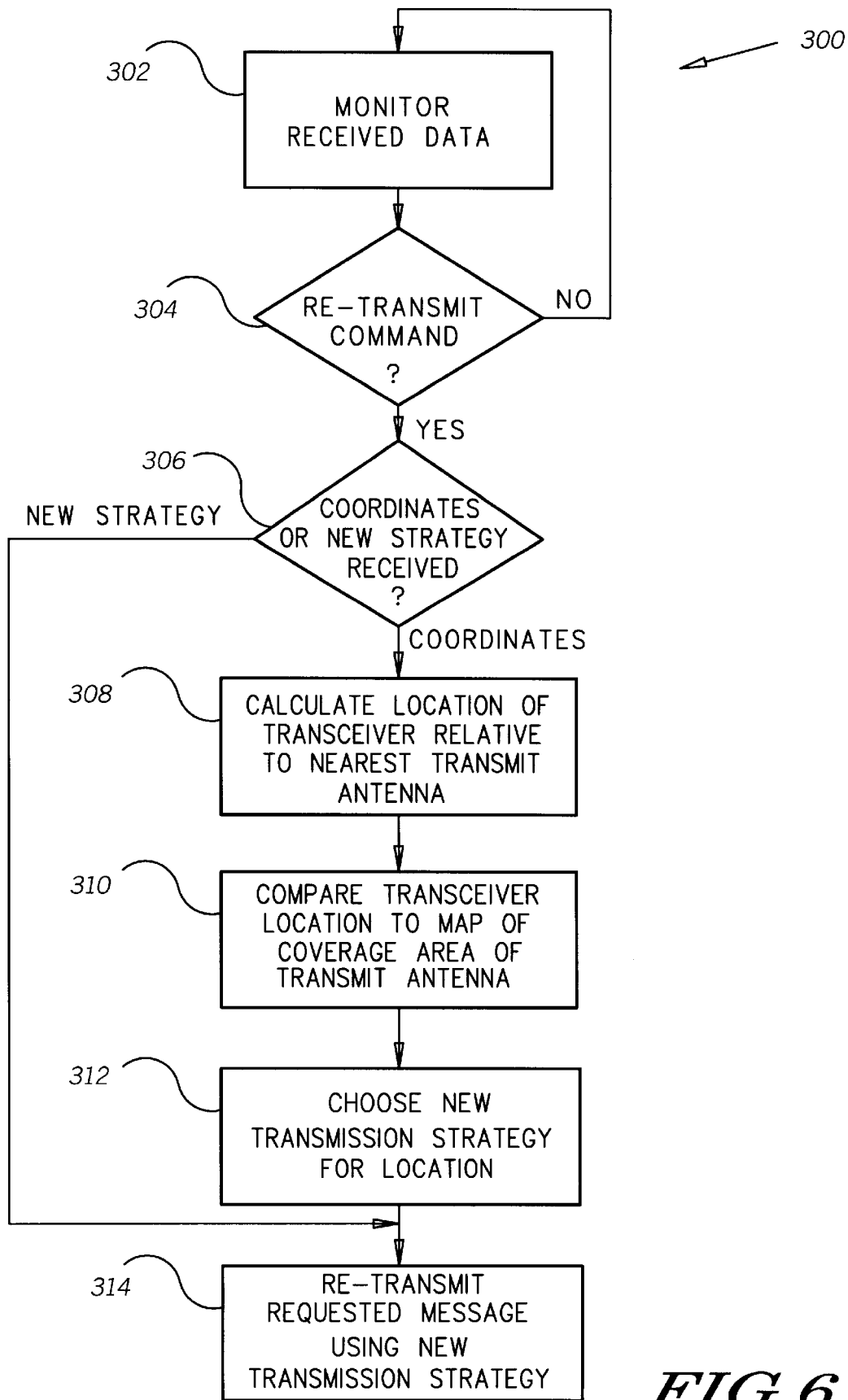

With reference to FIGS. 4 and 5, flow diagrams of the logic of the selective call radio 10 and selective call signal system 100, respectively, of the instant invention are depicted. Referring to FIG. 4, the transceiver 10 receives, stores, and monitors received messages and determines whether the received message contains uncorrectable errors in excess of a predetermined limit (see Blocks 202–206). If excessive errors are detected in the received message (Block 206), the selective call radio 10 via the processor 24 activates the global positioning system receiver (Block 208). Alternatively, the GPS receiver 12 could remain on continuously, or be periodically activated, independent of receiving messages, to update the radio 10 position, thereby rendering the location more quickly, but typically requiring more average power consumption in the radio 10. The global positioning system receiver 12 receives triangulation location information of the transceiver 10 until all coordinates are obtained and stores the coordinates in memory 20 (Blocks 210–214). Once the coordinates are stored in memory 20, the processor 24 deactivates the global positioning receiver 12 and the transceiver 14 transmits a retransmit command along with the location coordinates in the form of the acknowledge back signal to the selective call signal system station 110/120 (Block 215–218). This retransmit command, including location coordinates, is typically instigated by the processor 24, at step 218 in FIG. 4. Upon receiving the retransmit command and radio 10 location, the selective call signal system station 110/120 compares the location with a preconfigured map having corresponding communication strategies and selects a new transmission strategy compatible with the radio's 10 location. The station 110/120 may then transmit an alert signal identifying the strategy selected so that the radio 10 may receive the retransmit strategy at step 220 and make corresponding adjustments in the receiver circuit at step 221 for receiving the retransmit message at step 222 under the new strategy. In accordance with the first and second alternative embodiments of the present invention, the radio 10 has stored in memory a map corresponding to the map at the station 110/120 such that it may predetermine the retransmit strategy at step 217 based on its known location so that adjustments may be made to the receiver circuitry 14a for receiving the retransmitted message under the new strategy at step 222.

Referring to FIG. 5, in the preferred embodiment, the system station 110/120 monitors received data and looks for message retransmit commands, as seen in steps 302 and 304. The retransmit command includes location coordinates of the radio 10 and may also include a new transmission strategy selected by the radio 10, as discussed in the first and second alternative embodiments. If the retransmit command includes the location coordinates from the selective call radio/transceiver 10 without any new strategy information, the selective call signal system 100, via the system station 110/120, monitors the received data, and calculates where the radio 10 is located relative to the nearest transmitting antenna of a transceiver station 110 (see Blocks 302–308). The system station 110/120 then determines if the radio 10 is located in a fringe area 152 or a known interference-producing area 156, or both, by comparing the calculated transceiver location to the pre-stored coverage map of the paging system as described above with reference to FIG. 3. The selective call signal controller 120 then chooses the best transmission technique for the area in which the transceiver 10 is located (see Blocks 310–312). This assures that the transceiver 10 will have the best opportunity to receive an unerrored message when the requested message is retransmitted using the new transmission strategy (Block 314). In the first and second alternative embodiments, the selective call radio 10 may include in its retransmit command the new transmission strategy most suitable to its location. The coverage map used by the radio to select a transmission strategy is the same as that used by the selective call signal controller 120 in the preferred embodiment. If the new transmission strategy is selected and transmitted by the radio 10 in the retransmit command, as seen in step 304 and 306, then the station 110/120 bypasses the steps which necessitate calculating location and choosing a new strategy based on the radio's location. Rather, the system station 110/120 receives the new strategy, implements the new strategy, and retransmits the message using the new strategy, as seen in steps 306 and 314.

In a third alternative embodiment, the selective call signal transmission system 100 may incorporate a directional transmit antenna in place of an omnidirectional transmitting antenna for the transceiver station 110, wherein a beam of the directional antenna would be dedicated to retransmitting errored messages. The directional antenna realigns a beam in response to receiving the location coordinates of the selective call radio 10 so as to point towards the location of the selective call radio 10 and incorporate the appropriate transmission strategy before retransmitting the selective call signal.

Although this invention is described in reference to determining the selective call radio location in response to receiving a predetermined number of errors so as to obtain the best transmission strategy in the selective call signal system 100 for transmitting the selective call signal, the selective call radio location and message type may also be used by the radio processor 24 to obtain the optimal transmission strategy. For example, the selective call radio 10 may receive an indication in a preceding signal that a long message of predetermined number of bits is scheduled for transmission to the radio 10. In this case, the selective call radio 10 transmits an acknowledge back signal including its location coordinates so that the selective call signal system 100 can choose the optimal delivery technique based on the selective call radio 10 current location and the anticipated message type. Such an embodiment is similar to the alert signal discussed above. Moreover, based on the anticipated message type, the selective call signal system 100 may choose a determined number of levels of interleaving corresponding to the message type or length so as to overcome burst errors which may typically occur in the selective call radio's 10 current location.

It will be appreciated that by obtaining a substantially exact geographic location of the selective call radio 10 when a first message has been received by the selective call radio 10 and thereafter using the obtained location to select transmission strategy which has been predetermined for reliable communication of a second message, in accordance with parameters of the second message (e.g., length), the likelihood of successful reception of the second message when it is transmitted using the selected transmission strategy is very high, thereby improving overall system message throughput and reducing average system message delivery delay times in comparison to prior art systems.

What is claimed is:

1. A selective call radio that is capable of initiating a request for a re-transmission of a first selective call signal, said selective call radio comprising:

radio location determination means for determining a geographic location of said selective call radio;

a transceiver for receiving selective call signals including said first selective call signal, and for selectively transmitting the request for the re-transmission of said first selective call signal with said geographic location; and processing means, in electrical communication with said transceiver and said radio location determination means, for processing received selective call signals and for initiating a transmission of the request for the re-transmission of said first selective call signal in response to said processing means detecting an unacceptable level of errors in said first selective call signal, and for implementing an adaptively selected communication strategy which is based on said geographic location of said selective call radio, in response to an indication which is received by said transceiver which identifies said adaptively selected communication strategy.

2. A selective call radio as recited in claim 1, wherein said indication is received at the beginning of the re-transmission of said first selective call signal.

3. A selective call radio as recited in claim 1, wherein said indication is received in an alert message transmitted in response to the request and prior to the re-transmission of said first selective call signal.

4. A selective call radio according to claim 1, wherein said radio location determination means comprises:

satellite signal receiving means, in electrical communication with said processing means, for receiving a plurality of positioning signals from orbiting satellites; and a medium of instructions readable by said processing means for determining geographic location of said selective call radio from said positioning signals.

5. A selective call radio as recited in claim 4, wherein said processing means further comprises:

error detection means, in communication with said transceiver, for detecting errors in received selective call signals and for initiating said request for re-transmission when said unacceptable level of errors are detected.

6. A selective call radio as recited in claim 5, wherein said error detection means further comprises:

enabling means, in communication with said radio location determination means and said processing means, for activating a satellite signals receiving means to receive positioning signals.

7. A selective call radio as recited in claim 1, wherein said adaptively selected communication strategy comprises adjustments of at least one of a group of transmission parameters consisting of baud rate, frequency channel, transmit power, and interleaving levels.

8. A selective call signal control device for transmitting selective call signals to a selective call radio with improved reliability, said selective call signal control device comprising:

a transmitter for transmitting selective call signals to selective call radios using selectable transmission strategies;

a receiver for receiving selective call re-transmission requests comprising a request to re-transmit a first selective call signal, said request including a geographic location corresponding to said selective call radio;

processor means, in communication with said receiver, for processing said request received from said receiver and for determining a selected communication strategy according to said geographic location; and an adjustable transmission means, in communication with said transmitter, for automatically activating said selected communication strategy corresponding to said geographic location, wherein said adjustable transmission means transmits to said selective call radio an indication of said selected communication strategy prior to re-transmitting said first selective call signal using said selected communication strategy.

9. A selective call signal control device according to claim 8, wherein said adjustable transmission means comprises:

comparing means, in communication with said receiver, for comparing said geographic location with pre-identified interference determinations, said adjustable transmission means automatically activating said selected communication strategy corresponding to said geographic location in response to one of said pre-identified interference determinations.

10. A selective call signal control device according to claim 9, wherein said adjustable transmission means further comprises:

selection means, in communication with said comparing means, for selecting a communication strategy corresponding to said geographic location.

11. A selective call signal control device as recited in claim 10, wherein said processing means further comprises:

transmission activating means, in communication with said transmitter, for automatically activating said selected communication strategy, said transmitter re-transmitting said identifiable selective call signal in accordance with said selected communication strategy.

12. A selective call signal control device as recited in claim 11, wherein said adjustable transmission means comprises:

a processor readable medium of instructions for deriving and selecting said transmission strategies.

13. A selective call signal control device as recited in claim 9, wherein said adjustable transmission means comprises:

interference monitoring means, in communication with said comparing means, for storing a processor readable medium of instructions including a plurality of signal interference determinations corresponding to identifiable geographic locations relative to said transmitter means.

14. A selective call signal control device as recited in claim 13, wherein said adjustable transmission means further comprises:

a preconfigured processor readable medium of instructions including a plurality of selective call signal transmission strategies directly corresponding to said identifiable geographic locations.

15. A selective call signal control device as recited in claim 14, further comprising:

memory means, in communication with said processor means and said adjustable transmission means, for storing said selective call signal request, said identifiable geographic locations, said signal interference determinations, and said plurality of selective call signal transmission strategies.

16. A selective call signal control device as recited in claim 8, wherein said indication is transmitted at the beginning of the re-transmission of said first selective call signal.

17. A selective call signal control device as recited in claim 8, wherein said indication is transmitted in an alert message transmitted prior to the re-transmission of said first selective call signal.

18. A selective call signal control device as recited in claim 8, wherein said selected communication strategy comprises adjustments of at least one of a group of transmission parameters consisting of baud rate, frequency channel, transmit power, and interleaving levels.

19. A method used in a selective call radio for requesting re-transmission of a first selective call signal from a selective call signal transmission station to the selective call radio using an adaptively selected communication strategy based on a geographic location of said selective call radio, said method comprising the steps of:

(a) receiving the first selective call signal from said selective call transmission station:

(b) detecting an unacceptable level of errors in said first selective call signal;

(c) determining a geographic location of said selective call radio in response to step (b);

(d) transmitting a selective call signal request in response to step (b) from said selective call radio, including a request to re-transmit said first selective call signal, said request including said geographic location; and (e) implementing said adaptively selected communication strategy in said selective call radio in response to an indication of said adaptively selected communication strategy received by said selective call radio.

20. A method as recited in claim 19, further comprising before the step of determining said geographic location, the step of:

activating a geographic location receiver in said selective call radio for receiving satellite transmitted signals and processing said satellite transmitted signals received so as to determine said geographic location.

21. A method used in a selective call signal communication system including at least one selective call radio and at least one selective call signal transceiver station, said transceiver station for transmitting selective call signals to said selective call radio and for receiving transmission requests from said selective call radio, said method comprising the steps of:

(a) transmitting a first selective call signal to said selective call radio;

(b) receiving by said transceiver station a re-transmission request from said selective call radio as a result of an unacceptable level of errors detected by said selective call radio in said first selective call signal, said re-transmission request including a geographic location of said selective call radio;

(c) selecting a new communication strategy corresponding to said geographic location so as to overcome the unacceptable level of errors in a re-transmission of said first selective call signal;

(d) transmitting to said selective call radio an indication of said selected communication strategy; and (e) re-transmitting said first selective call signal to said selective call radio using said selected communication strategy.

22. A method as recited in claim 21, comprising after the steps of transmitting the first selective call signal, the step of:

determining the geographic location of said selective call radio; and activating a geographic location receiver in said selective call radio for receiving satellite transmitted signals and processing said satellite transmitted signals received so as to determine said geographic location.

23. A method as recited in claim 22, further comprising after the step of determining the geographic location, the step of:

comparing said geographic location with a plurality of transmission strategies corresponding to pre-identified geographic locations so as to select said new communication strategy corresponding to said geographic location to overcome the unacceptable level of errors.

24. A selective call radio that is capable of initiating transmission of a first selective call signal, said selective call radio comprising:

radio location determination means for determining a geographic location of said selective call radio;

a transceiver for receiving selective call signals and for selectively transmitting a request for transmission of said first selective call signal; and processing means, in electrical communication with said transceiver and said radio location determination means, for processing received selective call signals and for initiating transmission of said request in response to a prior selective call signal that indicates the first selective call signal is available at a control station and that indicates a message length of the first selective call signal, and for generating said request including said geographic location when the message length of said first selective call signal exceeds a predetermined value and for implementing an adaptively selected communication strategy which is based on said geographic location of said selective call radio.

25. A selective call radio as recited in claim 24, wherein said processing means implements said adaptively selected communication strategy in said transceiver in response to a selection of said adaptively selected communication strategy determined by a comparison of said geographic location with locations, listed in the selective call radio, having preselected communication strategies known to overcome interference.

26. A selective call radio as recited in claim 24, wherein said processing means implements said adaptively selected communication strategy in said transceiver in response to an indication of said adaptively selected communication strategy received by said transceiver.

27. A selective call radio as recited in claim 26, wherein said indication of said adaptively selected communication strategy is received at the beginning of transmission of said first selective call signal.

28. A selective call radio as recited in claim 26, wherein said indication of said adaptively selected communication strategy is received in an alert message transmitted in response to said request and prior to transmission of said first selective call signal.

29. A selective call signal control device for transmitting selective call signals to a selective call radio with improved reliability, said selective call signal control device comprising:
   a transmitter for transmitting selective call signals to selective call radios, wherein the transmitter transmits a message length of a first selective call signal using a default communication strategy;
   a receiver for receiving selective call transmission requests comprising a request to transmit said first selective call signal, said request including a geographic location corresponding to said selective call radio;
   processor means, in communication with said receiver, for processing said request received from said receiver and for determining a selected communication strategy according to said geographic location; and
   an adjustable transmission means, in communication with said transmitter, for automatically activating said selected communication strategy corresponding to said geographic location, wherein said adjustable transmission means transmits to said selective call radio an indication of said selected communication strategy prior to transmitting said first selective call signal using said selected communication strategy.

30. A selective call radio that is capable of initiating re-transmission of a first selective call signal, said selective call radio comprising:
   radio location determination means for determining a geographic location of said selective call radio;
   a transceiver for receiving selective call signals including said first selective call signal and for selectively transmitting a request for re-transmission of said first selective call signal, said request including said geographic location; and
   processing means, in electrical communication with said transceiver and said radio location determination means, for processing received selective call signals and for initiating transmission of said request in response to said processing means detecting an unacceptable level of errors in said first selective call signal, and for implementing an adaptively selected communication strategy in said transceiver in response to a selection of said adaptively selected communication strategy determined by a comparison of said geographic location with geographic locations listed in the selective call radio having preselected communication strategies known to overcome interference.

31. A selective call radio that is capable of initiating re-transmission of a first selective call signal, said selective call radio comprising:
   radio location determination means for determining a geographic location of said selective call radio;
   a transceiver for receiving selective call signals including said first selective call signal and for selectively transmitting a request for re-transmission of said first selective call signal, said request including an indication of said adaptively selected communication strategy; and
   processing means, in electrical communication with said transceiver and said radio location determination means, for processing received selective call signals and for initiating transmission of said request in response to said processing means detecting an unacceptable level of errors in said first selective call signal, and for implementing an adaptively selected communication strategy in said transceiver in response to a selection of said adaptively selected communication strategy determined by a comparison of said geographic location with locations listed in the selective call radio having preselected communication strategies known to overcome interference.

32. A method used in a selective call radio for requesting transmission of a first selective call signal from a selective call signal transmission station to the selective call radio using an adaptively selected communication strategy based on a geographic location of said selective call radio, said method comprising the steps of:
   (a) receiving a message length of a first selective call signal from said transmission station using a default communication strategy;
   (b) detecting said message length as exceeding a predetermined length;
   (c) determining a geographic location of said selective call radio in response to step (b);
   (d) transmitting a selective call signal request in response to step (b) from said selective call radio, including a request to transmit said first selective call signal, said request including said geographic location; and
   (e) implementing said adaptively selected communication strategy which is based on said geographic location of said selective call radio.

33. The method as recited in claim 32, wherein in said step of implementing, said adaptively selected communication strategy is implemented in response to a selection of said adaptively selected communication strategy determined by a comparison of said geographic location with locations, listed in the selective call radio, having preselected communication strategies known to overcome interference.

34. The method as recited in claim 32, wherein in said step of implementing, said adaptively selected communication strategy is implemented in response to an indication of said adaptively selected communication strategy received by said transceiver.

35. A method used in a selective call radio for requesting re-transmission of a first selective call signal from a selective call signal transmission station to the selective call radio using an adaptively selected communication strategy based on a geographic location of said selective call radio, said method comprising the steps of:
   (a) receiving said first selective call signal from said transmission station;
   (b) detecting an unacceptable level of errors in said first selective call signal;
   (c) determining a geographic location of said selective call radio in response to step (b);
   (d) transmitting a selective call signal request in response to step (b) from said selective call radio, including a request to re-transmit said first selective call signal, said request including said geographic location; and (e) selecting said adaptively selected communication strategy by comparing said geographic location with geographic locations listed in the selective call radio having preselected communication strategies known to overcome interference; and (f) implementing said adaptively selected communication strategy in said selective call radio in response to step (e).

36. A method used in a selective call radio for requesting re-transmission of a first selective call signal from a selective call signal transmission station to the selective call radio using an adaptively selected communication strategy based on a geographic location of said selective call radio, said method comprising the steps of:

(a) receiving said first selective call signal from said transmission station;

(b) detecting an unacceptable level of errors in said first selective call signal;

(c) determining a geographic location of said selective call radio in response to step (b);

(d) selecting said adaptively selected communication strategy by comparing said geographic location with geographic locations listed in the selective call radio having preselected communication strategies known to overcome interference (e) transmitting a selective call signal request in response to step (b) from said selective call radio, including a request to re-transmit said first selective call signal, said request including an indication of said adaptively selected communication strategy; and (f) implementing said adaptively selected communication strategy in said selective call radio in response to a selective call signal received from the selective call signal transmission station.

* * * * *

UNITED STATES PATENT AND TRADEMARK OFFICE
CERTIFICATE OF CORRECTION

PATENT NO. : 5,831,545
DATED : November 3, 1998
INVENTOR(S) : Murray et al.

It is certified that error appears in the above-identified patent and that said Letters Patent is hereby corrected as shown below:

Column 18, line 7, add --;-- after the word "interference".

Column 18, line 7, delete "(e) transmitting a selective call".

Column 18, line 8, begin new paragraph as follows: --(e) transmitting a selective call--.

Signed and Sealed this

Twenty-first Day of December, 1999

Attest:

Q. TODD DICKINSON

Attesting Officer

Acting Commissioner of Patents and Trademarks